US011036490B2

(12) United States Patent
Thakkar et al.

(10) Patent No.: US 11,036,490 B2
(45) Date of Patent: Jun. 15, 2021

(54) PROACTIVE STORAGE SYSTEM-BASED SOFTWARE VERSION ANALYSIS USING MACHINE LEARNING TECHNIQUES

(71) Applicant: EMC IP Holding Company LLC, Hopkinton, MA (US)

(72) Inventors: Bina K. Thakkar, Cary, NC (US); Aditya Krishnan, Cary, NC (US); Deepak Gowda, Cary, NC (US); Shenee Prakash Ashara, Raleigh, NC (US)

(73) Assignee: EMC IP Holding Company LLC, Hopkinton, MA (US)

( * ) Notice: Subject to any disclaimer, the term of this patent is extended or adjusted under 35 U.S.C. 154(b) by 4 days.

(21) Appl. No.: 16/670,077

(22) Filed: Oct. 31, 2019

(65) Prior Publication Data

US 2021/0132933 A1 May 6, 2021

(51) Int. Cl.
*G06F 8/65* (2018.01)
*G06N 20/00* (2019.01)
(Continued)

(52) U.S. Cl.
CPC .............. *G06F 8/65* (2013.01); *G06F 3/0607* (2013.01); *G06F 3/0653* (2013.01);
(Continued)

(58) Field of Classification Search
CPC .......... G06F 8/65; G06F 40/40; G06F 3/0607; G06F 3/0653; G06F 3/0683; G06N 20/00; G06N 7/005
See application file for complete search history.

(56) References Cited

U.S. PATENT DOCUMENTS 8,612,261 B1 * 12/2013 Swanson ................ G16H 10/60
705/3
9,378,200 B1 6/2016 Cohen et al.
(Continued)

OTHER PUBLICATIONS

Sidorov et al., "Soft Similarity and Soft Cosine Measure: Similarity of Features in Vector Space Model" (Year: 2014).*
(Continued)

*Primary Examiner* — Phillip H Nguyen
(74) *Attorney, Agent, or Firm* — Ryan, Mason & Lewis, LLP

(57) ABSTRACT

Methods, apparatus, and processor-readable storage media for proactive storage system-based software version analysis using machine learning techniques are provided herein. An example computer-implemented method includes obtaining storage system data from multiple storage systems; determining performance issues among the storage systems by applying a machine learning algorithm to the storage system data; automatically grouping the storage system data into a set of groups based on issue type among the determined performance issues; automatically grouping, within the set, the storage system data into subsets based on a software version attributed to the corresponding storage system data; generating an output pertaining to actions to be performed with respect to at least one software version update; and transmitting the output to users of the storage systems which correspond to the storage system data in at least one of the subsets.

20 Claims, 10 Drawing Sheets

(51) Int. Cl.
*G06N 7/00* (2006.01)
*G06F 3/06* (2006.01)
*G06F 40/40* (2020.01)

(52) U.S. Cl.
CPC ............ *G06F 3/0683* (2013.01); *G06F 40/40* (2020.01); *G06N 7/005* (2013.01); *G06N 20/00* (2019.01)

(56) References Cited

U.S. PATENT DOCUMENTS

| | | | |
|---|---|---|---|
| 9,454,423 B2* | 9/2016 | Jacoby | G06F 11/079 |
| 9,602,356 B1* | 3/2017 | Dubrovsky | H04L 41/12 |
| 9,672,279 B1 | 6/2017 | Cohen et al. | |
| 9,886,314 B2* | 2/2018 | Borowiec | G06F 3/067 |
| 9,886,338 B1* | 2/2018 | Khokhar | G06F 11/34 |
| 10,102,055 B1 | 10/2018 | Gaber et al. | |
| 10,127,304 B1 | 11/2018 | Cohen et al. | |
| 10,235,452 B1 | 3/2019 | Savir et al. | |
| 10,275,408 B1 | 4/2019 | Cohen et al. | |
| 10,514,978 B1* | 12/2019 | Lee | G06F 11/0793 |
| 10,817,311 B1* | 10/2020 | Han | G06F 9/44521 |
| 2007/0027985 A1* | 2/2007 | Ramany | H04L 67/125 |
| | | | 709/224 |
| 2013/0159989 A1* | 6/2013 | Deckert | G06F 8/65 |
| | | | 717/172 |
| 2015/0074463 A1* | 3/2015 | Jacoby | G06F 11/0727 |
| | | | 714/37 |
| 2018/0285090 A1* | 10/2018 | Das | G06F 8/65 |
| 2019/0340459 A1* | 11/2019 | Faibish | G06N 20/00 |
| 2020/0012580 A1* | 1/2020 | Saito | G06F 3/0673 |

OTHER PUBLICATIONS

Li et al., "Distance Weighted Cosine Similarity Measure for Text Classification" (Year: 2020).*
Dell EMC, CloudIQ Detailed Review, Jun. 2019.

* cited by examiner

```
repeat for each user service request (SR):
    // clean text, punctuations such as -\,#:, etc.
    remove punctuation
    // remove words such as a, an, here, if, have, etc.
    remove stop words
    // lemmatization - look at morphological analysis of the word
    Extract lemma
    // consistent text
    convert to lower case
get vector representation for each cleaned service request
    $SR_1 = [w_1, w_2, \ldots w_n]$
    $SR_2 = [x_1, x_2, \ldots x_n]$
    ...
    $SR_n = [z_1, z_2, \ldots z_n]$
for all SRs    similarity measure = cosine of angle between $(SR_1, SR_2, \ldots SR_n)$
for SRs with identical similarity measures
    group by category
    group by version
    calculate count
    normalize count against total systems for a version
```

| Similar Service Requests (Based on Similarity Measure) | Service Request Category | Version | Systems with Service Requests | Total Systems | Normalized Value |
|---|---|---|---|---|---|
| Similarity Measure 1 - Storage Pool Object | Category1 | 4.3 | 319 | 3186 | 0.1 |
| | Category1 | 4.4 | 4513 | 5014 | 0.9 |
| | Category1 | 4.5 | 1774 | 8871 | 0.2 |
| | Category1 | 5.0 | 38 | 383 | 0.1 |
| Similarity Measure 2 - Storage Upgrade | Category2 | 4.3 | 319 | 3186 | 0.1 |
| | Category2 | 4.4 | 501 | 5014 | 0.1 |
| | Category2 | 4.5 | 8871 | 8871 | 0 |
| | Category2 | 5.0 | 382 | 383 | 0 |

FIG. 6

PROACTIVE STORAGE SYSTEM-BASED SOFTWARE VERSION ANALYSIS USING MACHINE LEARNING TECHNIQUES

FIELD

The field relates generally to information processing systems, and more particularly to techniques for processing software version-related information in such systems.

BACKGROUND

Monitoring and/or analyzing storage system data requires access to data from the relevant storage systems. However, various problems can arise to prevent such access. For example, such problems can be caused by the relevant storage systems running on outdated software versions. Using conventional storage system management approaches to identify software version-related data access issues, however, is labor-intensive and often inaccurate and/or inconsistent.

Additionally, challenges and issues pertaining to software versions extend beyond the access-related example noted above, and conventional storage system management approaches experience similar challenges in detecting other version-related issues as well.

SUMMARY

Illustrative embodiments of the disclosure provide techniques for proactive storage system-based software version analysis using machine learning techniques. An exemplary computer-implemented method includes obtaining storage system data from multiple storage systems, and determining one or more performance issues among the multiple storage systems by applying at least one machine learning algorithm to the obtained storage system data. Such a method also includes automatically grouping the obtained storage system data into a set of groups based at least in part on issue type among the one or more determined performance issues, and automatically grouping, within one or more groups in the set, the storage system data into one or more subsets based at least in part on a software version attributed to the corresponding storage system data. Further, such a method additionally includes generating an output pertaining to one or more actions to be performed with respect to at least one software version update, and transmitting the output to one or more users of one or more of the multiple storage systems which correspond to the storage system data in at least one of the one or more subsets.

Illustrative embodiments can provide significant advantages relative to conventional storage system management approaches. For example, challenges associated with inaccurate and/or inconsistent software version-based data access issue determinations are overcome in one or more embodiments through grouping storage system issues in accordance with the application of one or more machine learning algorithms to storage system data.

These and other illustrative embodiments described herein include, without limitation, methods, apparatus, systems, and computer program products comprising processor-readable storage media.

BRIEF DESCRIPTION OF THE DRAWINGS

FIG. 5 shows example pseudocode for machine learning-based version analysis for service requests in an illustrative embodiment.

FIG. 6 shows an output table pertaining to storage system-based software version analysis in an illustrative embodiment.

DETAILED DESCRIPTION

Illustrative embodiments will be described herein with reference to exemplary computer networks and associated computers, servers, network devices or other types of processing devices. It is to be appreciated, however, that the invention is not restricted to use with the particular illustrative network and device configurations shown. Accordingly, the term "computer network" as used herein is intended to be broadly construed, so as to encompass, for example, any system comprising multiple networked processing devices.

Figure 1:
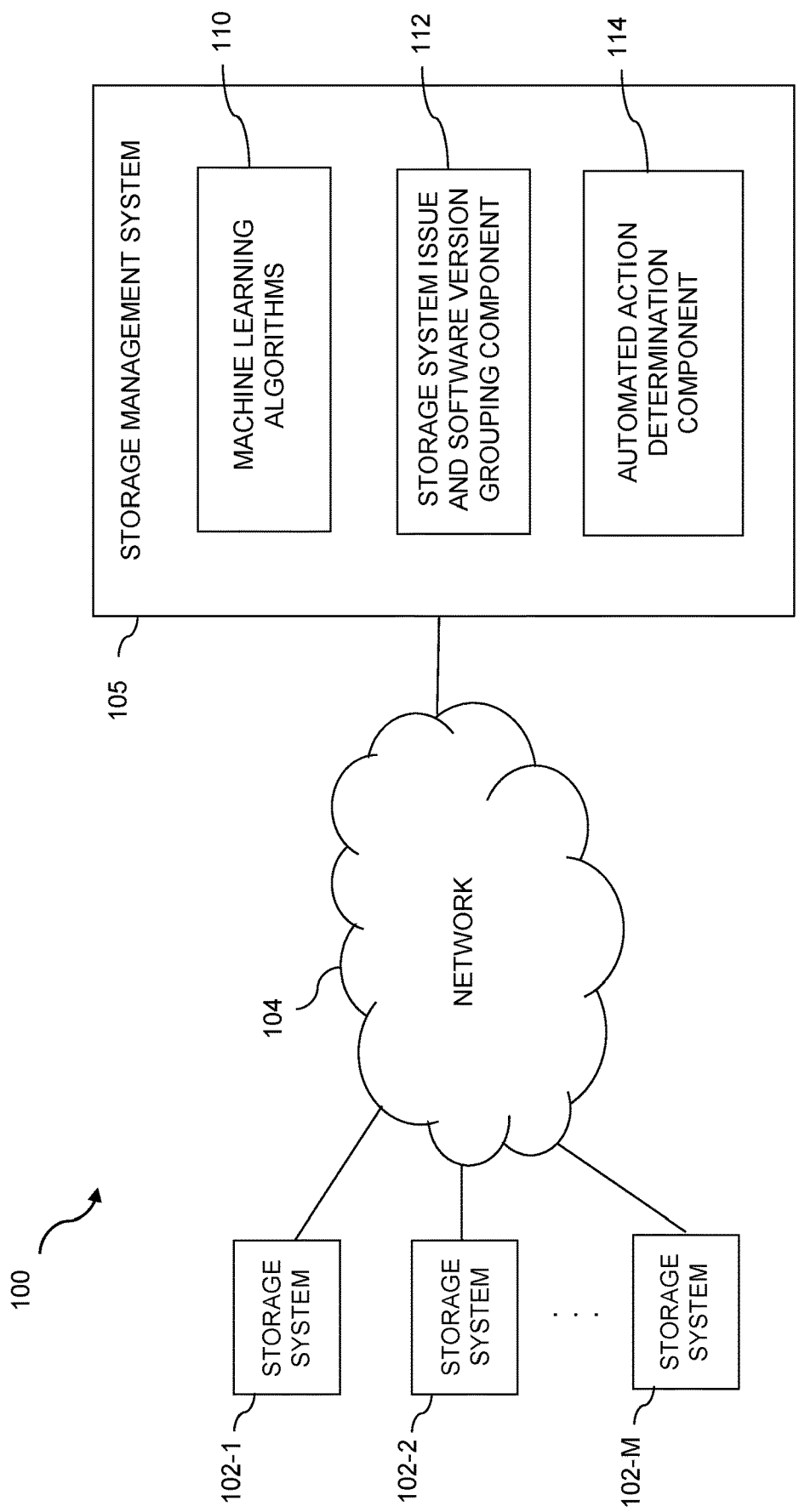
FIG. 1 shows an information processing system configured for storage system-based software version analysis using machine learning techniques in an illustrative embodiment.

FIG. 1 shows a computer network (also referred to herein as an information processing system) 100 configured in accordance with an illustrative embodiment. The computer network 100 comprises a plurality of storage systems 102-1, 102-2, . . . 102-M, collectively referred to herein as storage systems 102. It is to be appreciated that storage systems 102 are utilized in FIG. 1 as merely an example of a type of system that can be utilized in accordance with at least one embodiment, and other types of systems can be utilized in one or more embodiments. Accordingly, the storage systems 102 are coupled to a network 104, where the network 104 in this embodiment is assumed to represent a sub-network or other related portion of the larger computer network 100. Accordingly, elements 100 and 104 are both referred to herein as examples of "networks" but the latter is assumed to be a component of the former in the context of the FIG. 1 embodiment. Also coupled to network 104 is storage management system 105.

The storage systems 102 may comprise any of a variety of different types of storage including network-attached storage (NAS), storage area networks (SANs), direct-attached storage (DAS) and distributed DAS, as well as combinations of these and other storage types, including software-defined storage.

The storage systems 102 in some embodiments comprise respective systems associated with a particular company, set of users, organization or other enterprise. In addition, at least portions of the computer network 100 may also be referred to herein as collectively comprising an "enterprise network." Numerous other operating scenarios involving a wide variety of different types and arrangements of processing devices and networks are possible, as will be appreciated by those skilled in the art.

Also, it is to be appreciated that the term "user" in this context and elsewhere herein is intended to be broadly construed so as to encompass, for example, human, hardware, software or firmware entities, as well as various combinations of such entities.

The network 104 is assumed to comprise a portion of a global computer network such as the Internet, although other types of networks can be part of the computer network 100, including a wide area network (WAN), a local area network (LAN), a satellite network, a telephone or cable network, a cellular network, a wireless network such as a Wi-Fi or WiMAX network, or various portions or combinations of these and other types of networks. The computer network 100 in some embodiments therefore comprises combinations of multiple different types of networks, each comprising processing devices configured to communicate using internet protocol (IP) or other related communication protocols.

Additionally, the storage management system 105 in the FIG. 1 embodiment is assumed to be implemented using at least one processing device. Each such processing device generally comprises at least one processor and an associated memory, and implements one or more functional modules for controlling certain features of the storage management system 105.

More particularly, the storage management system 105 in this embodiment each can comprise a processor coupled to a memory and a network interface.

The processor illustratively comprises a microprocessor, a microcontroller, an application-specific integrated circuit (ASIC), a field-programmable gate array (FPGA) or other type of processing circuitry, as well as portions or combinations of such circuitry elements.

The memory illustratively comprises random access memory (RAM), read-only memory (ROM) or other types of memory, in any combination. The memory and other memories disclosed herein may be viewed as examples of what are more generally referred to as "processor-readable storage media" storing executable computer program code or other types of software programs.

One or more embodiments include articles of manufacture, such as computer-readable storage media. Examples of an article of manufacture include, without limitation, a storage device such as a storage disk, a storage array or an integrated circuit containing memory, as well as a wide variety of other types of computer program products. The term "article of manufacture" as used herein should be understood to exclude transitory, propagating signals.

The network interface allows the storage management system 105 to communicate over the network 104 with the storage systems 102, and illustratively comprises one or more conventional transceivers.

As also depicted in FIG. 1, the storage management system 105 further comprises machine learning algorithms 110, a storage system issue and software version grouping component 112, and an automated action determination component 114.

It is to be appreciated that this particular arrangement of elements 110, 112 and 114 illustrated in the storage management system 105 of the FIG. 1 embodiment is presented by way of example only, and alternative arrangements can be used in other embodiments. For example, the functionality associated with the elements 110, 112 and 114 in other embodiments can be combined into a single module, or separated across a larger number of modules. As another example, multiple distinct processors can be used to implement different ones of the elements 110, 112 and 114 or portions thereof.

At least portions of the elements 110, 112 and 114 may be implemented at least in part in the form of software that is stored in memory and executed by a processor.

It is to be understood that the particular set of elements shown in FIG. 1 for machine learning-based version analysis involving storage systems 102 of computer network 100 is presented by way of illustrative example only, and in other embodiments additional or alternative elements may be used. Thus, another embodiment includes additional or alternative systems, devices and other network entities, as well as different arrangements of modules and other components.

An exemplary process utilizing elements 110, 112 and 114 of an example storage management system 105 in computer network 100 will be described in more detail with reference to the flow diagrams of FIG. 7 and FIG. 8.

Accordingly, at least one embodiment of the invention includes identifying issues that occur in specific software versions of storage systems using natural language processing (NLP) machine learning techniques. Also, one or more embodiments include identifying issues by performing version analysis of connectivity data, data processing information, and/or health-related data. As further detailed herein, the combination of reactive and proactive approaches can expedite storage system problem resolution with respect to specific versions of storage systems software applications. The NLP machine learning techniques noted above can be used, for example, to group similar service requests. Additionally, along with implementation of the NLP machine learning techniques, at least one embodiment includes analyzing connectivity data, data processing information and health-related information collected across different software versions.

As detailed herein, at least one embodiment includes a reactive machine learning-based version analysis. Such an embodiment includes obtaining user (or customer) service request data, wherein such data can include problem descriptions, serial numbers, category information, and version information for one or more systems (e.g., storage systems) across multiple users within at least one enterprise. Additionally, such an embodiment also includes applying one or more NLP feature engineering techniques to the obtained data, such as, for example, cleaning one or more text features, removing one or more stop words, removing one or more specific non-value-added words, etc. Further preprocessing steps can be taken with respect to the obtained data, such as, for example, applying one or more lemmatization techniques, converting portions of text to lower case, etc.

Also, such a reactive machine learning-based version analysis includes calculating term-based similarity measures among the service request data using at least one cosine NLP algorithm. Using these calculated similarity measures, such an embodiment further includes grouping the service requests based at least in part on SR category and software version (associated with the SR). For SRs with same (or sufficiently similar) similarity measures, category and software version association, the reactive machine learning-based version analysis includes calculating a count of those SRs, and then normalizing the calculated count against the total number of SRs associated with the given software version. The calculated normalized value represents the possibility of the occurrence of a given issue for the specified software version.

Additionally, as detailed herein, at least one embodiment includes a proactive machine learning-based version analysis. Such an embodiment includes obtaining system data (e.g., storage system data) that include health-related information attributed to one or more systems (e.g., storage systems), connectivity status information pertaining to one or more systems, and data processing status information pertaining to one or more systems. Also, utilizing the obtained data, such an embodiment includes grouping the system data based at least in part on health-related issue type(s), connectivity status issue type(s), data processing issue type(s), and software version associated with the given service request. For system data with the same grouping(s), the proactive machine learning-based version analysis includes calculating a count of those systems, and then normalizing the calculated count against the total number of systems associated with the given software version. The calculated normalized values for a health-related issue, a connectivity status issue, and/or a data processing issue represent the possibility of the occurrence of the given issue for the specified software version.

Also, one or more embodiments can include incorporating a regular (e.g., daily) report generated based at least in part on SRs, connectivity-related information, data processing-related information, and health-related information to facilitate identification of problems associated with one or more specific software versions. Such an embodiment can include utilizing such reports to identify a software version wherein a problem was introduced, as well as identifying one or more software versions wherein one or more problems were resolved.

Figure 2:
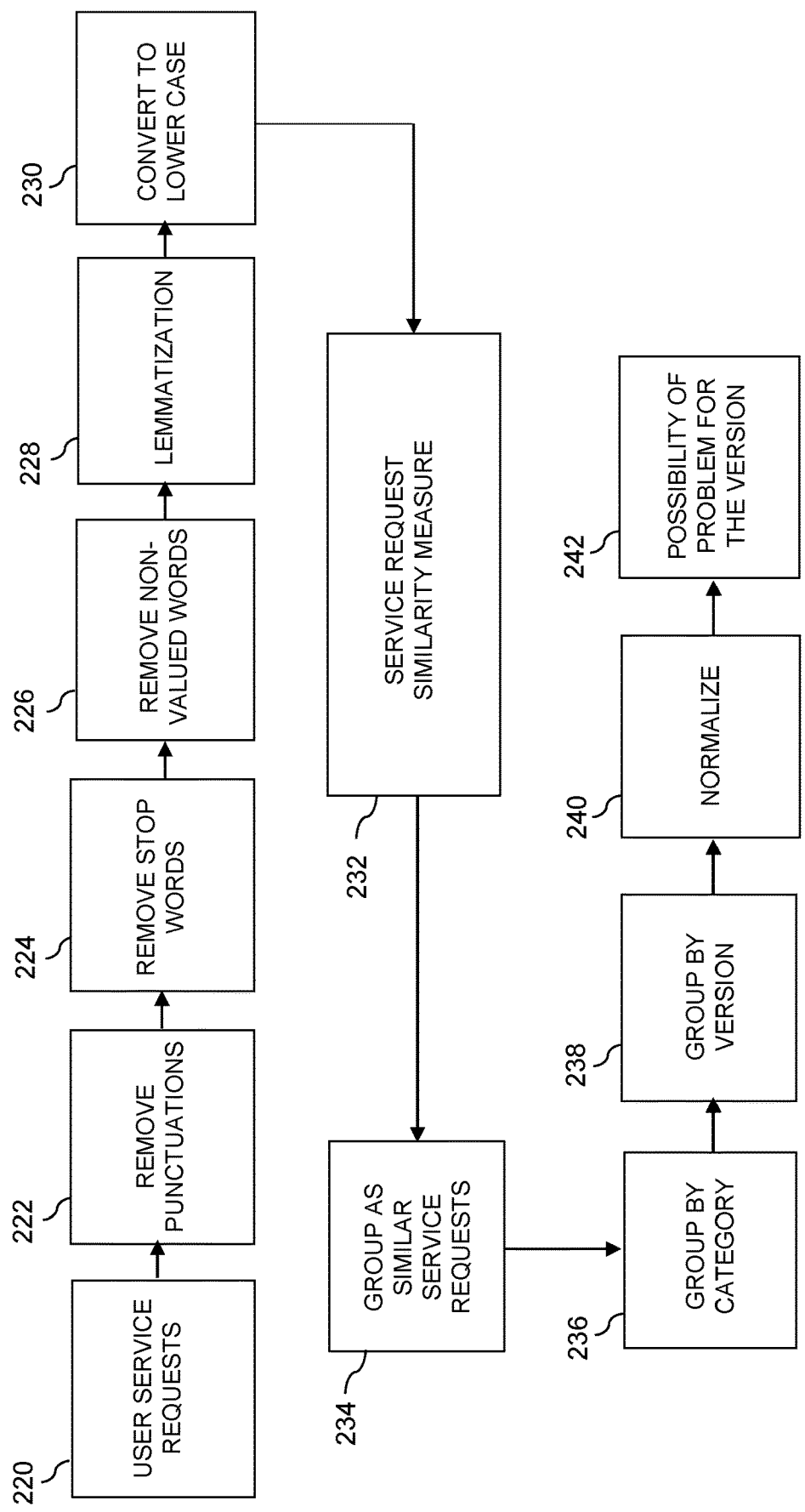
FIG. 2 shows reactive storage system-based software version analysis using machine learning techniques in an illustrative embodiment.

FIG. 2 shows reactive storage system-based software version analysis using machine learning techniques in an illustrative embodiment. By way of illustration, FIG. 2 depicts user service requests 220, and in connection with such service requests, removing one or more punctuations in step 222, removing one or more stop words in step 224, removing one or more non-valued words in step 226, performing one or more lemmatization techniques in step 228, and converting at least a portion of text in the service requests 220 to lower case in step 230. Additionally, FIG. 2 depicts applying at least one service request similarity measure to the processed service request data in step 232, wherein, in one or more embodiments, the at least one service request similarity measure includes a cosine NLP algorithm.

Based at least in part on the output of step 232, similar service requests are grouped in step 234, and such similar service requests are further grouped by category in step 236, and grouped by associated software version in step 238. The grouped service requests are then normalized (e.g., based at least in part on count information) in step 240, and an output is generated in step 242 which includes the possibility of a given problem for at least one particular software version.

Figure 3:
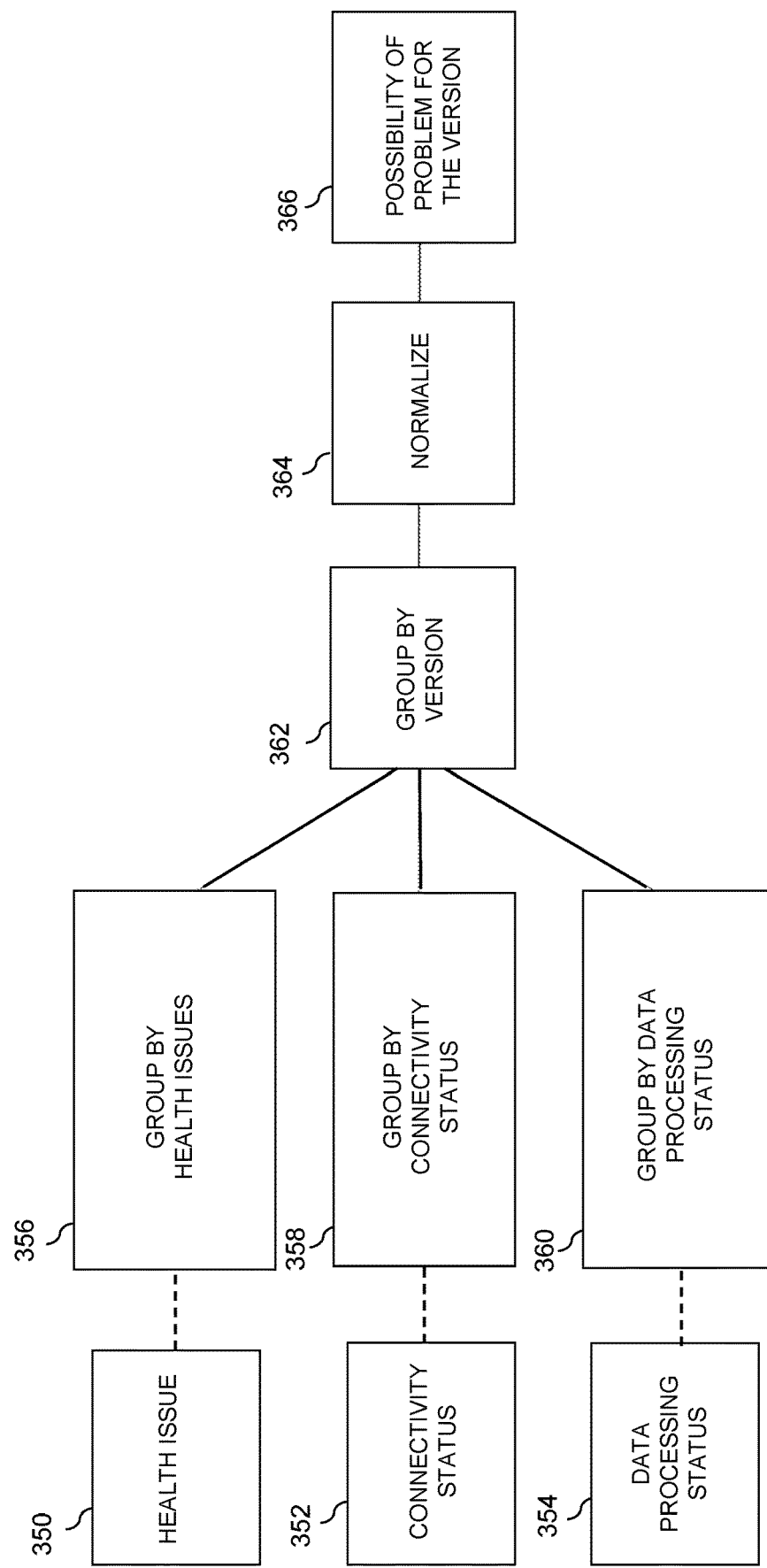
FIG. 3 shows proactive storage system-based software version analysis using machine learning techniques in an illustrative embodiment.

FIG. 3 shows proactive storage system-based software version analysis using machine learning techniques in an illustrative embodiment. By way illustration, FIG. 3 depicts system data (e.g., storage system data) that include health issue information 350, connectivity status information 352, and data processing status information 354. Additionally, FIG. 3 depicts grouping the system data in step 356 by health-related issues (e.g., host connectivity, overlapped subnet, replication asynchronous recovery point objective (RPO), etc.), grouping the system data in step 358 by connectivity status (e.g., data collect, configurations, performance, etc.), and grouping the system data in step 360 by data processing status (e.g., alert, configurations, performance, data protection, etc.). Also, based at least in part on the groupings determined in steps 356, 358, and/or 360, step 362 includes further grouping the system data by associated software version. For system data with the same version grouping, FIG. 3 additionally depicts normalizing, in step 364, a calculated count of systems in the group against the total number of systems associated with the given software version. Based at least in part on this normalization in step 364, an output is generated in step 366 which represents possibility of the occurrence of one or more of the given issues for the specified software version.

Figure 4:
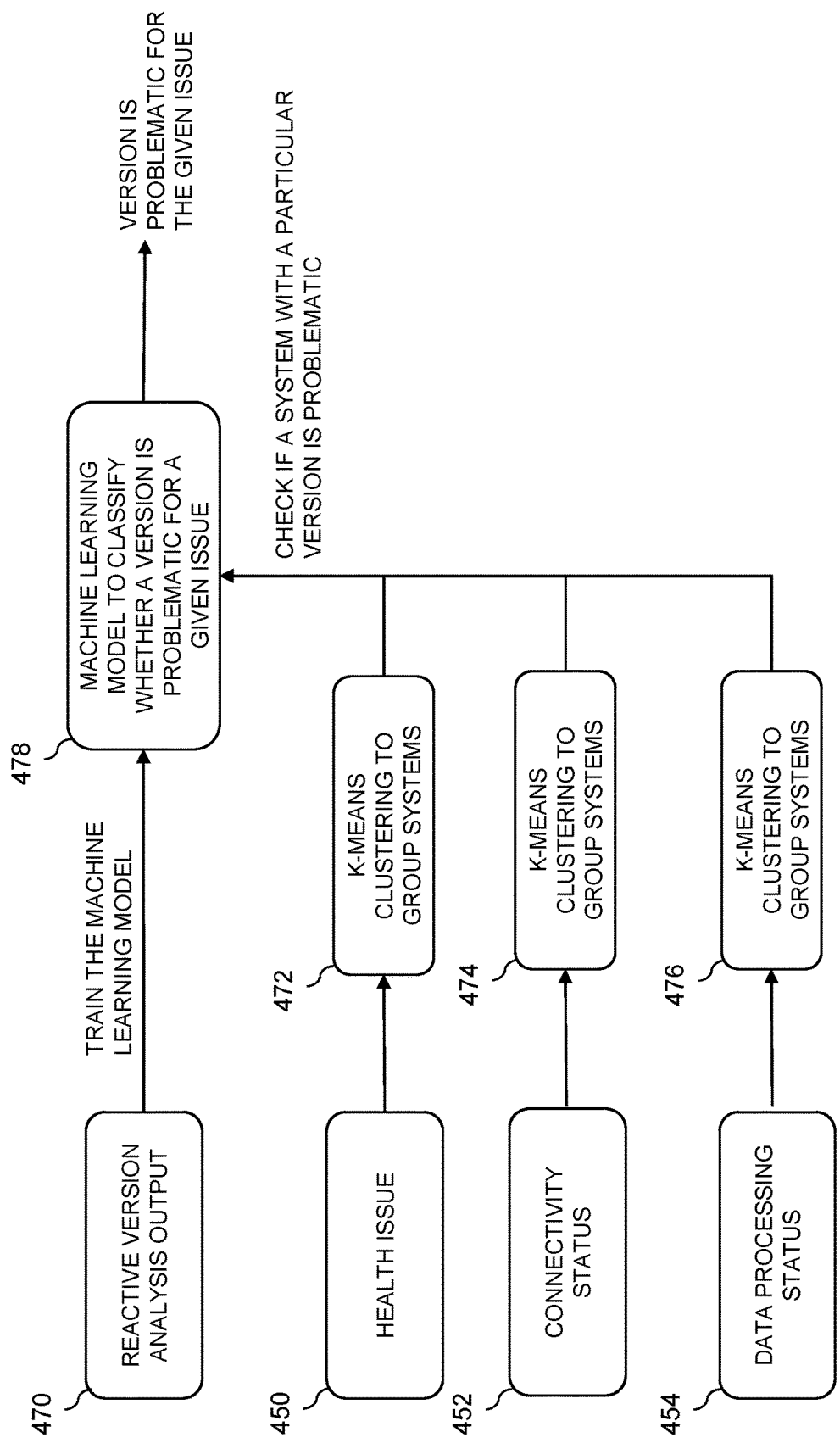
FIG. 4 shows machine learning-based proactive software version analysis in an illustrative embodiment.

FIG. 4 shows machine learning-based proactive software version analysis in an illustrative embodiment. By way of illustration, FIG. 4 depicts at least one reactive version analysis output 470 (e.g., the output generated in step 242 of FIG. 2), which is used to train a machine learning model 478 for classifying whether a software version is problematic for a given issue. As also illustrated, FIG. 4 depicts system data (e.g., storage system data) that include health issue information 450, connectivity status information 452, and data processing status information 454. Additionally, FIG. 4 depicts applying at least one k-means clustering technique to the health issue information 450 in step 472 to group systems based on health issues. Similarly, step 474 includes applying at least one k-means clustering technique to the connectivity status information 452 to group systems based on connectivity issues. Further, step 476 includes applying at least one k-means clustering technique to the data processing status information 454 to group systems based on data processing issues.

The system groupings determined via steps 472, 474, and 476 are then provided to the machine learning model 478 to determine if one or more of the systems associated with a particular software version are problematic with respect to one or more given issues. The machine learning model 478 subsequently generates an output identifying at least one software version that is problematic for at least one given issue.

Referring now to FIG. 5, another illustrative embodiment is shown. In this embodiment, pseudocode 500 is executed by or under the control of a processing device, such as storage management system 105, or another type of processing device. For example, the pseudocode 500 may be viewed as comprising a portion of a software implementation of at least part of machine learning algorithms 110 of the FIG. 1 embodiment.

The pseudocode 500 illustrates an example pseudocode for machine learning-based version analysis for service requests in an illustrative embodiment. Specifically, the pseudocode 500 details repeating preprocessing techniques (such as cleaning text, removing punctuation and non-value words, lemmatization, case conversion, etc.) for each of one or more user service requests (SRs). Additionally, the pseudocode 500 provides for determining a vector representation for each of the preprocessed service requests, and, for all such service requests, calculating a similarity measure among the service requests. Further, for SRs with identical similarity measures, the pseudocode 500 includes grouping the SRs by various parameters (e.g., by category, by group, etc.), calculating counts, and normalizing the counts against the total number of systems for one or more particular software versions.

It is to be appreciated that this particular pseudocode shows just one example implementation of a process for machine learning-based version analysis for service requests, and alternative implementations of the process can be used in other embodiments.

FIG. 6 shows an output table pertaining to storage system-based software version analysis in an illustrative embodiment. By way of illustration, FIG. 6 depicts table 600, which presents information related to similar service requests, wherein such information includes service request category, software version, total number of systems with service requests, total number of systems, and a normalized value representing the software version association.

Figure 7:
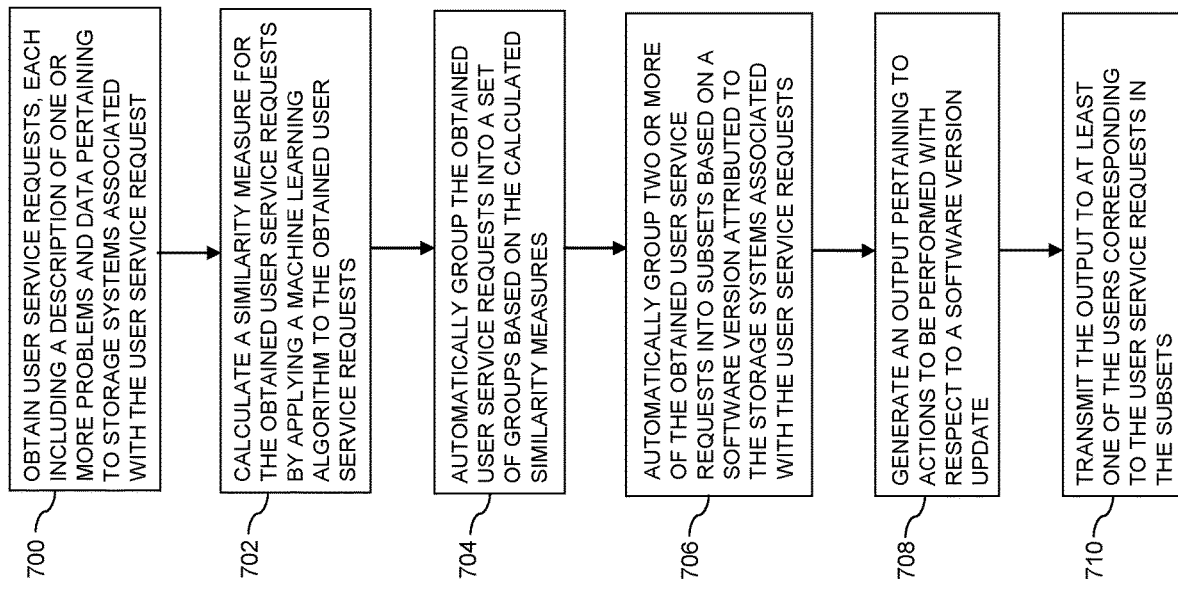
FIG. 7 is a flow diagram of a process for reactive storage system-based software version analysis using machine learning techniques in an illustrative embodiment.

FIG. 7 is a flow diagram of a process for reactive storage system-based software version analysis using machine learning techniques in an illustrative embodiment. It is to be understood that this particular process is only an example, and additional or alternative processes can be carried out in other embodiments.

In this embodiment, the process includes steps 700 through 710. These steps are assumed to be performed at least in part by the storage management system 105 utilizing its modules 110, 112 and 114.

Step 700 includes obtaining multiple user service requests, wherein each of the user service requests comprises a description of one or more problems and data pertaining to one or more storage systems associated with the user service request.

Step 702 includes calculating one or more similarity measures for the obtained user service requests by applying at least one machine learning algorithm to the obtained user service requests. In one or more embodiments, the at least one machine learning algorithm includes at least one natural language processing technique. In such an embodiment, applying the at least one natural language processing technique includes preprocessing the obtained user service requests using one or more normalization techniques.

Using one or more normalization techniques can include removing, from the obtained user service requests, one or more stop words and one or more predetermined non-stop words. Additionally, using one or more normalization techniques can also include performing at least one lemmatization process on the obtained user service requests subsequent to removing the one or more stop words and one or more predetermined non-stop words. Further, using one or more normalization techniques can include converting, subsequent to performing the at least one lemmatization process, text in the obtained user service requests to a lower case format. Also, in at least one embodiment, applying the at least one natural language processing technique includes applying a cosine natural language processing algorithm to the lower case-formatted user service requests to calculate the one or more similarity measures.

Step 704 includes automatically grouping the obtained user service requests into a set of groups based at least in part on the calculated similarity measures. Step 706 includes automatically grouping, within one or more groups in the set, two or more of the obtained user service requests into one or more subsets based at least in part on a software version attributed to the storage systems associated with the two or more user service requests. At least one embodiment also includes normalizing the two or more user service requests in the one or more subsets against a total number of service requests associated with the software version.

Step 708 includes generating an output pertaining to one or more actions to be performed with respect to at least one software version update. In one or more embodiments, generating the output includes calculating a probability that at least one of the one or more problems has occurred due to an absence of performing the at least one software version update.

Step 710 includes transmitting the output to at least one of the users corresponding to the user service requests in at least one of the one or more subsets. At least one embodiment additionally includes automatically initiating the one or more actions.

Accordingly, the particular processing operations and other functionality described in conjunction with the flow diagram of FIG. 7 are presented by way of illustrative example only, and should not be construed as limiting the scope of the disclosure in any way. For example, the ordering of the process steps may be varied in other embodiments, or certain steps may be performed concurrently with one another rather than serially.

Figure 8:
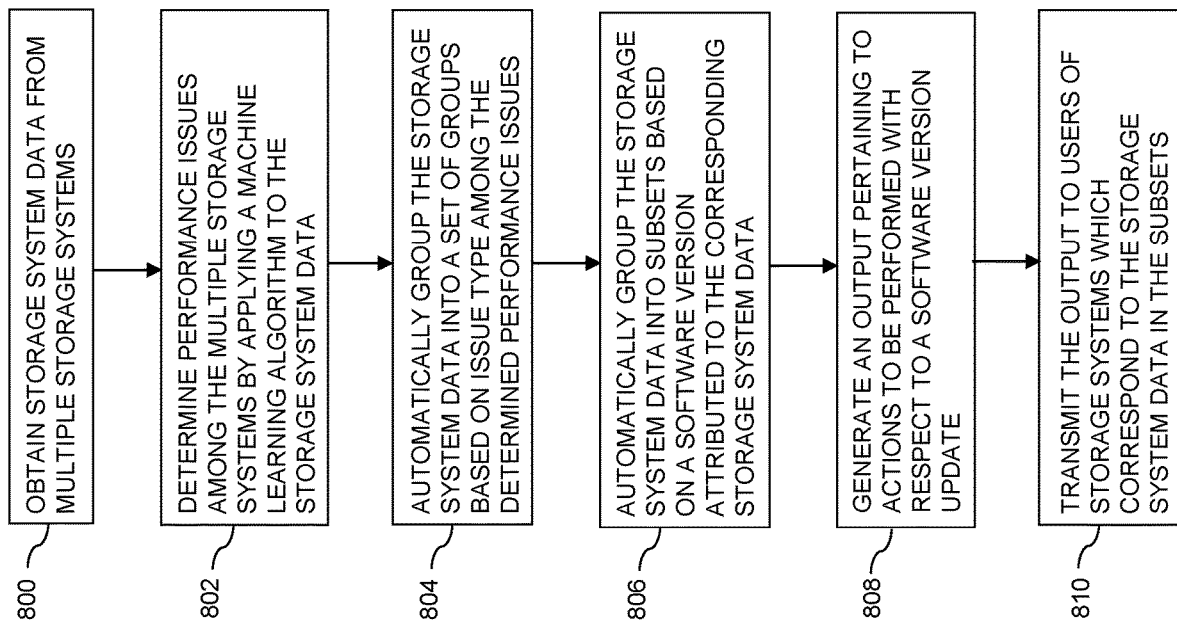
FIG. 8 is a flow diagram of a process for proactive storage system-based software version analysis using machine learning techniques in an illustrative embodiment.

FIG. 8 is a flow diagram of a process for proactive storage system-based software version analysis using machine learning techniques in an illustrative embodiment. It is to be understood that this particular process is only an example, and additional or alternative processes can be carried out in other embodiments.

In this embodiment, the process includes steps 800 through 810. These steps are assumed to be performed at least in part by the storage management system 105 utilizing its modules 110, 112 and 114.

Step 800 includes obtaining storage system data from multiple storage systems. Step 802 includes determining one or more performance issues among the multiple storage systems by applying at least one machine learning algorithm to the obtained storage system data. In at least one embodiment, the storage system data include health-related data pertaining to one or more of the multiple storage systems, connectivity status-related data pertaining to one or more of the multiple storage systems, and/or data processing status-related data pertaining to one or more of the multiple storage systems. In such an embodiment, applying the at least one machine learning algorithm includes applying at least one natural language processing technique to the obtained storage system data to identify one or more health-related issue types pertaining to one or more of the multiple storage systems, to identify one or more connectivity status-related issue types pertaining to one or more of the multiple storage systems, and/or to identify one or more data processing status-related issue types pertaining to one or more of the multiple storage systems.

Step 804 includes automatically grouping the obtained storage system data into a set of groups based at least in part on issue type among the one or more determined performance issues. Step 806 includes automatically grouping, within one or more groups in the set, the storage system data into one or more subsets based at least in part on a software version attributed to the corresponding storage system data. At least one embodiment additionally includes calculating, in connection with each of the one or more subsets, a total count of user service requests related to the given subset. Such an embodiment can also include normalizing, in connection with each of the one or more subsets, the total count of user service requests against a total number of user service requests associated with the software version.

Step 808 includes generating an output pertaining to one or more actions to be performed with respect to at least one software version update. In one or more embodiments, generating the output includes calculating a probability that at least one storage system-related problem will occur in an absence of performing the at least one software version update.

Step 810 includes transmitting the output to one or more users of one or more of the multiple storage systems which correspond to the storage system data in at least one of the one or more subsets. At least one embodiment also includes automatically initiating the one or more actions.

Accordingly, the particular processing operations and other functionality described in conjunction with the flow diagram of FIG. 8 are presented by way of illustrative example only, and should not be construed as limiting the scope of the disclosure in any way. For example, the ordering of the process steps may be varied in other embodiments, or certain steps may be performed concurrently with one another rather than serially.

The above-described illustrative embodiments provide significant advantages relative to conventional approaches. For example, some embodiments are configured to identify issues that occur in specific software versions of storage systems using machine learning techniques. These and other embodiments can effectively expedite storage system problem resolution with respect to specific versions of storage systems software applications.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

As mentioned previously, at least portions of the information processing system 100 can be implemented using one or more processing platforms. A given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform used to implement at least a portion of an information processing system comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components, or portions thereof, are illustratively implemented for use by tenants of such a multi-tenant environment.

As mentioned previously, cloud infrastructure as disclosed herein can include cloud-based systems. Virtual machines provided in such systems can be used to implement at least portions of a computer system in illustrative embodiments.

In some embodiments, the cloud infrastructure additionally or alternatively comprises a plurality of containers implemented using container host devices. For example, as detailed herein, a given container of cloud infrastructure illustratively comprises a Docker container or other type of Linux Container (LXC). The containers are run on virtual machines in a multi-tenant environment, although other arrangements are possible. The containers are utilized to implement a variety of different types of functionality within the system 100. For example, containers can be used to implement respective processing devices providing compute and/or storage services of a cloud-based system. Again, containers may be used in combination with other virtualization infrastructure such as virtual machines implemented using a hypervisor.

Illustrative embodiments of processing platforms will now be described in greater detail with reference to FIGS. 9 and 10. Although described in the context of system 100, these platforms may also be used to implement at least portions of other information processing systems in other embodiments.

Figure 9:
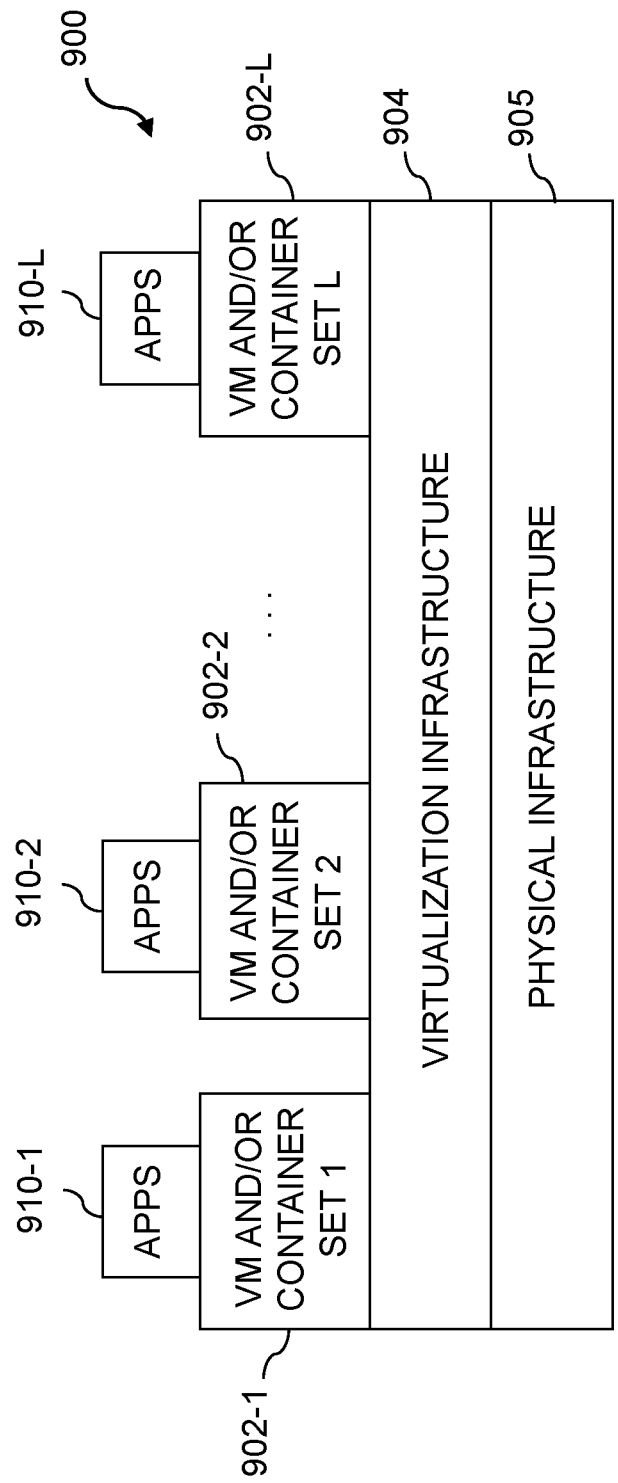
FIGS. 9 and 10 show examples of processing platforms that may be utilized to implement at least a portion of an information processing system in illustrative embodiments.
Figure 10:
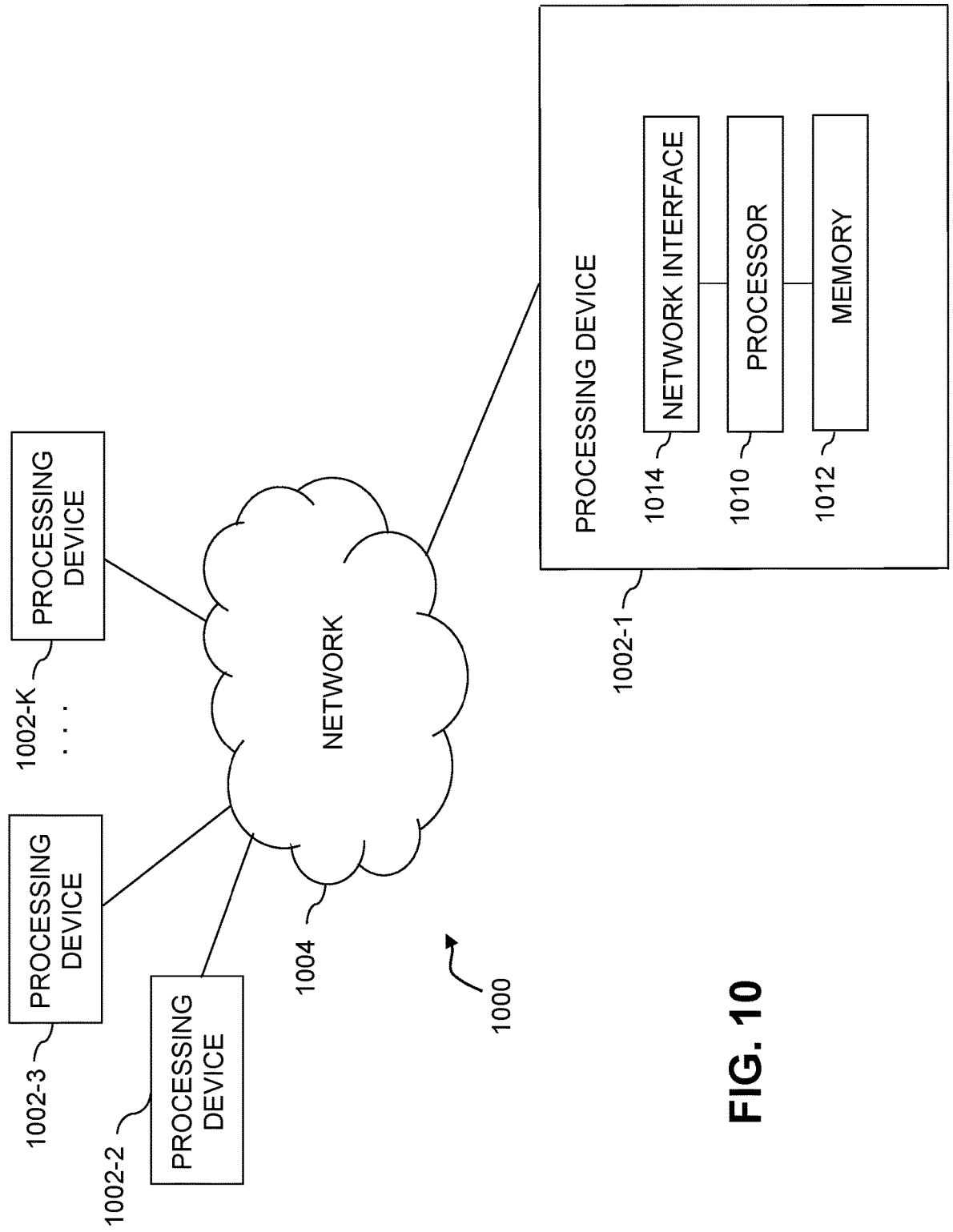

FIG. 9 shows an example processing platform comprising cloud infrastructure 900. The cloud infrastructure 900 comprises a combination of physical and virtual processing resources that are utilized to implement at least a portion of the information processing system 100. The cloud infrastructure 900 comprises multiple virtual machines (VMs) and/or container sets 902-1, 902-2, . . . 902-L implemented using virtualization infrastructure 904. The virtualization infrastructure 904 runs on physical infrastructure 905, and illustratively comprises one or more hypervisors and/or operating system level virtualization infrastructure. The operating system level virtualization infrastructure illustratively comprises kernel control groups of a Linux operating system or other type of operating system.

The cloud infrastructure 900 further comprises sets of applications 910-1, 910-2, . . . 910-L running on respective ones of the VMs/container sets 902-1, 902-2, . . . 902-L under the control of the virtualization infrastructure 904. The VMs/container sets 902 comprise respective VMs, respective sets of one or more containers, or respective sets of one or more containers running in VMs. In some implementations of the FIG. 9 embodiment, the VMs/container sets 902 comprise respective VMs implemented using virtualization infrastructure 904 that comprises at least one hypervisor.

A hypervisor platform may be used to implement a hypervisor within the virtualization infrastructure 904, wherein the hypervisor platform has an associated virtual infrastructure management system. The underlying physical machines comprise one or more distributed processing platforms that include one or more storage systems.

In other implementations of the FIG. 9 embodiment, the VMs/container sets 902 comprise respective containers implemented using virtualization infrastructure 904 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element is viewed as an example of what is more generally referred to herein as a "processing device." The cloud infrastructure 900 shown in FIG. 9 may represent at least a portion of one processing platform. Another example of such a processing platform is processing platform 1000 shown in FIG. 10.

The processing platform 1000 in this embodiment comprises a portion of system 100 and includes a plurality of processing devices, denoted 1002-1, 1002-2, 1002-3, . . . 1002-K, which communicate with one another over a network 1004.

The network 1004 comprises any type of network, including by way of example a global computer network such as the Internet, a WAN, a LAN, a satellite network, a telephone or cable network, a cellular network, a wireless network such as a Wi-Fi or WiMAX network, or various portions or combinations of these and other types of networks.

The processing device 1002-1 in the processing platform 1000 comprises a processor 1010 coupled to a memory 1012.

The processor 1010 comprises a microprocessor, a microcontroller, an application-specific integrated circuit (ASIC), a field-programmable gate array (FPGA) or other type of processing circuitry, as well as portions or combinations of such circuitry elements.

The memory 1012 comprises random access memory (RAM), read-only memory (ROM) or other types of memory, in any combination. The memory 1012 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture comprises, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 1002-1 is network interface circuitry 1014, which is used to interface the processing device with the network 1004 and other system components, and may comprise conventional transceivers.

The other processing devices 1002 of the processing platform 1000 are assumed to be configured in a manner similar to that shown for processing device 1002-1 in the figure.

Again, the particular processing platform 1000 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage products or devices, or other components are possible in the information processing system 100. Such components can communicate with other elements of the information processing system 100 over any type of network or other communication media.

For example, particular types of storage products that can be used in implementing a given storage system of a distributed processing system in an illustrative embodiment include all-flash and hybrid flash storage arrays, scale-out all-flash storage arrays, scale-out NAS clusters, or other types of storage arrays. Combinations of multiple ones of these and other storage products can also be used in implementing a given storage system in an illustrative embodiment.

It should again be emphasized that the above-described embodiments are presented for purposes of illustration only. Many variations and other alternative embodiments may be used. Also, the particular configurations of system and device elements and associated processing operations illustratively shown in the drawings can be varied in other embodiments. Thus, for example, the particular types of storage systems, networks and processing devices in a given embodiment and their respective configurations may be varied. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A computer-implemented method comprising:
    obtaining storage system data from multiple storage systems;
    determining one or more performance issues among the multiple storage systems by calculating one or more term-based cosine similarity measures among at least a portion of the obtained storage system data by processing the at least a portion of the obtained storage system data using at least one machine learning-based natural language processing algorithm;
    automatically grouping the obtained storage system data into a set of groups based at least in part on issue type among the one or more determined performance issues;
    automatically grouping, within one or more groups in the set, the storage system data into one or more subsets based at least in part on a software version attributed to the corresponding storage system data;
    generating an output pertaining to one or more actions to be performed with respect to at least one software version update; and
    transmitting the output to one or more users of one or more of the multiple storage systems which correspond to the storage system data in at least one of the one or more subsets;
    wherein the method is performed by at least one processing device comprising a processor coupled to a memory.

2. The computer-implemented method of claim 1, further comprising:
    automatically initiating the one or more actions.

3. The computer-implemented method of claim 1, wherein the storage system data comprise one or more of health-related data pertaining to one or more of the multiple storage systems, connectivity status-related data pertaining to one or more of the multiple storage systems, and data processing status-related data pertaining to one or more of the multiple storage systems.

4. The computer-implemented method of claim 3, wherein processing the at least a portion of the obtained storage system data comprises identifying one or more health-related issue types pertaining to one or more of the multiple storage systems.

5. The computer-implemented method of claim 3, wherein processing the at least a portion of the obtained storage system data comprises identifying one or more connectivity status-related issue types pertaining to one or more of the multiple storage systems.

6. The computer-implemented method of claim 3, wherein processing the at least a portion of the obtained storage system data comprises identifying one or more data processing status-related issue types pertaining to one or more of the multiple storage systems.

7. The computer-implemented method of claim 1, further comprising:
calculating, in connection with each of the one or more subsets, a total count of user service requests related to the given subset.

8. The computer-implemented method of claim 7, further comprising:
normalizing, in connection with each of the one or more subsets, the total count of user service requests against a total number of user service requests associated with the software version.

9. The computer-implemented method of claim 1, wherein generating the output comprises calculating a probability that at least one storage system-related problem will occur in an absence of performing the at least one software version update.

10. A non-transitory processor-readable storage medium having stored therein program code of one or more software programs, wherein the program code when executed by at least one processing device causes the at least one processing device:
to obtain storage system data from multiple storage systems;
to determine one or more performance issues among the multiple storage systems by calculating one or more term-based cosine similarity measures among at least a portion of the obtained storage system data by processing the at least a portion of the obtained storage system data using at least one machine learning-based natural language processing algorithm;
to automatically group the obtained storage system data into a set of groups based at least in part on issue type among the one or more determined performance issues;
to automatically group, within one or more groups in the set, the storage system data into one or more subsets based at least in part on a software version attributed to the corresponding storage system data;
to generate an output pertaining to one or more actions to be performed with respect to at least one software version update; and
to transmit the output to one or more users of one or more of the multiple storage systems which correspond to the storage system data in at least one of the one or more subsets.

11. The non-transitory processor-readable storage medium of claim 10, wherein the storage system data comprise one or more of health-related data pertaining to one or more of the multiple storage systems, connectivity status-related data pertaining to one or more of the multiple storage systems, and data processing status-related data pertaining to one or more of the multiple storage systems.

12. The non-transitory processor-readable storage medium of claim 11, wherein processing the at least a portion of the obtained storage system data comprises identifying one or more health-related issue types pertaining to one or more of the multiple storage systems.

13. The non-transitory processor-readable storage medium of claim 11, wherein processing the at least a portion of the obtained storage system data comprises identifying one or more connectivity status-related issue types pertaining to one or more of the multiple storage systems.

14. The non-transitory processor-readable storage medium of claim 11, wherein processing the at least a portion of the obtained storage system data comprises identifying one or more data processing status-related issue types pertaining to one or more of the multiple storage systems.

15. The non-transitory processor-readable storage medium of claim 10, wherein generating the output comprises calculating a probability that at least one storage system-related problem will occur in an absence of performing the at least one software version update.

16. An apparatus comprising:
at least one processing device comprising a processor coupled to a memory;
the at least one processing device being configured:
to obtain storage system data from multiple storage systems;
to determine one or more performance issues among the multiple storage systems by calculating one or more term-based cosine similarity measures among at least a portion of the obtained storage system data by processing the at least a portion of the obtained storage system data using at least one machine learning-based natural language processing algorithm;
to automatically group the obtained storage system data into a set of groups based at least in part on issue type among the one or more determined performance issues;
to automatically group, within one or more groups in the set, the storage system data into one or more subsets based at least in part on a software version attributed to the corresponding storage system data;
to generate an output pertaining to one or more actions to be performed with respect to at least one software version update; and
to transmit the output to one or more users of one or more of the multiple storage systems which correspond to the storage system data in at least one of the one or more subsets.

17. The apparatus of claim 16, wherein processing the at least a portion of the obtained storage system data comprises identifying one or more health-related issue types pertaining to one or more of the multiple storage systems.

18. The apparatus of claim 16, wherein processing the at least a portion of the obtained storage system data comprises identifying one or more connectivity status-related issue types pertaining to one or more of the multiple storage systems.

19. The apparatus of claim 16, wherein processing the at least a portion of the obtained storage system data comprises identifying one or more data processing status-related issue types pertaining to one or more of the multiple storage systems.

20. The apparatus of claim 16, wherein generating the output comprises calculating a probability that at least one storage system-related problem will occur in an absence of performing the at least one software version update.

* * * * *